Oct. 25, 1932.  J. NEWMIER  1,884,138
COOLER
Filed June 23, 1931

Inventor
Joseph Newmier

By Clarence A. O'Brien
Attorney

Patented Oct. 25, 1932

1,884,138

UNITED STATES PATENT OFFICE

JOSEPH NEWMIER, OF STRATFORD, WISCONSIN

COOLER

Application filed June 23, 1931. Serial No. 546,382.

This invention relates to a device for cooling fluid, and has as its primary object the provision of means for effecting a circulation of a cooling medium through the liquid to be cooled.

A still further object of the invention is to provide an improved coil for the circulation of the cooling medium, the coil being capable of being submerged in the liquid to be cooled.

Other objects and advantages of the invention will become apparent from a study of the following description, taken in connection with the accompanying drawing wherein.

Figures 1, 2, 3:
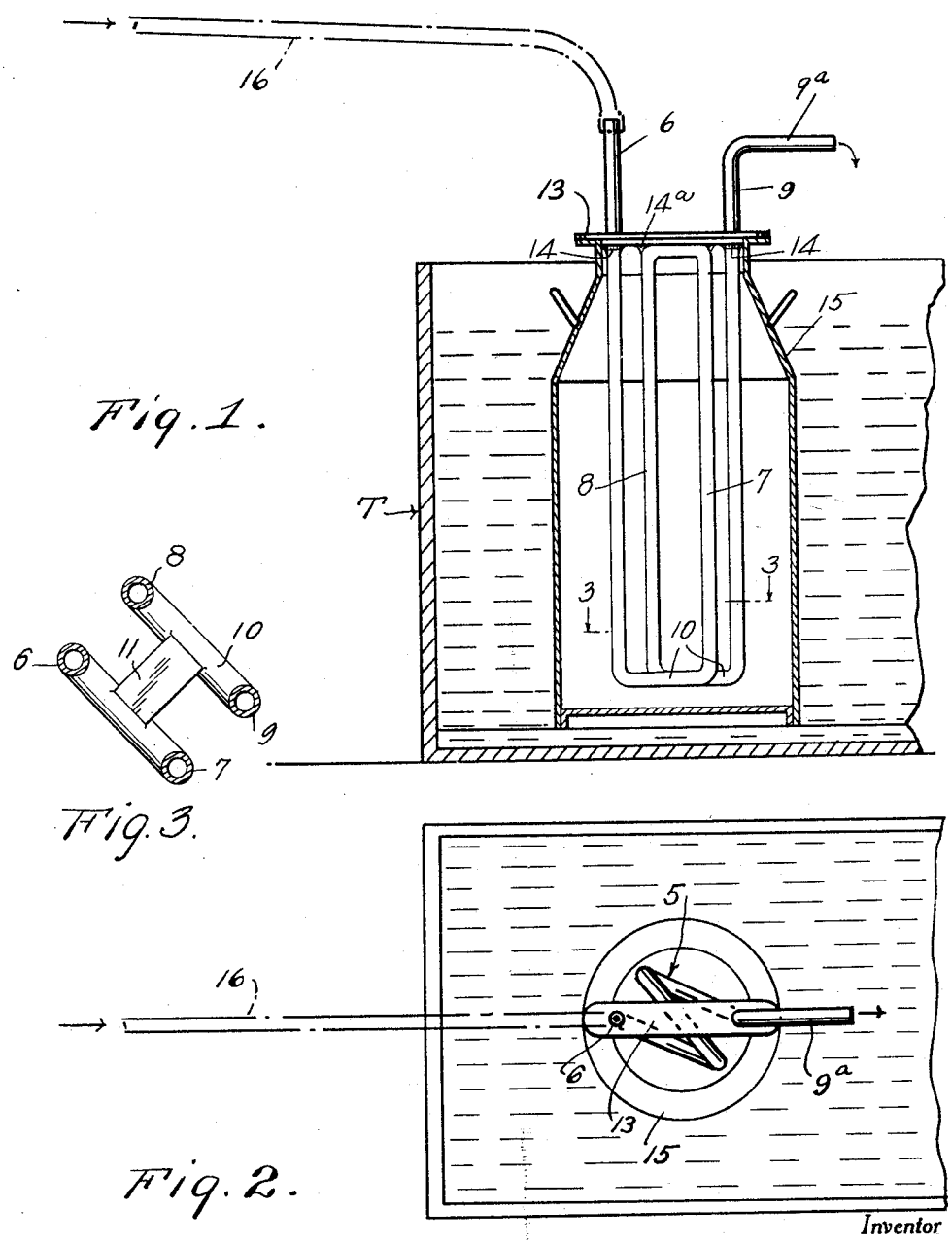
Figure 1 is a sectional elevational view of a milk can arranged in a tank, a circulating coil embodying the features of the present invention being arranged in the milk can.
Figure 2 is a top plan view of the structure shown in Figure 1.
Figure 3 is a transverse horizontal sectional view taken substantially on the line 3—3 of Figure 1.

With reference more in detail to the drawing, it will be seen that 5 designates generally a circulating coil, the same being formed of metal or other suitable material and including a single length of tubing bent to provide two substantially U-shaped portions, each of which includes spaced parallel portions 6, 7 and 8, 9 respectively. The parallel portions of each U-shaped section are connected at their lower ends by a substantially horizontal connecting portion 10. The portions 10 are in substantial spaced parallelism and offset relative to one another. A combined connector and brace plate 11 connect the portions 10 as shown in Figure 4.

The portions 7 and 8 constitute the inner convolutions of the coils, and at their upper ends are connected by a portion 12. The portion 6 constitutes an outer intake convolution for the coil, and at its free end is adapted to be connected to a hose or the like 13 leading from a suitable source of supply. The portion 9 constitutes the outer discharge convolution of the coil, and at its upper end is provided with a lateral discharge extension 9a.

The upper ends of the convolutions 6 and 9 of the coil are connected by a cross plate 13 welded or otherwise secured thereto as at 14. Plate 13 is provided with apertures through which the ends 6 and 9 of the coil extend. The plate 13 is also welded to the connecting part 12 as at 14a.

From what has been hereinbefore stated, it will be seen that I have devised a simple and inexpensive, yet durable coil and as suggested in Figures 1 and 2, the same may be passed downwardly into a milk pail or like container 15. The cooling medium may be in the nature of cold water, supplied through the coil to the hose 16 and it will be apparent that with the coil submerged in the milk, or other contents of the receptacle 15, a circulation of the cold water or cooling medium through the coil will insure sufficient cooling of the milk.

In actual practice I have found it advisable, to place the milk can or receptacle 15 within a suitable tank T as shown in Figures 1 and 2 so that the cooling medium discharging through end 9a of the coil will seek a level in the tank T with the result that the milk or contents of the receptacle 15 is cooled from within and without the receptacle 15.

Even though I have herein shown and described the preferred embodiment of my invention, it is to be understood that changes may be made in the invention without departing from the spirit or scope thereof.

Having thus described my invention, what I claim as new is:

A device for cooling liquids comprising in combination a circulating coil consisting of a single length of tubing including a plurality of relatively spaced end and intermediate parallel portions, a part of said tubing connecting corresponding ends of the intermediate portions with one another, said end portions projecting beyond the connected ends of the intermediate portions, and at said projecting ends being open, a plate connecting the projecting ends of said end portions and secured to the part connecting said intermediate portion, one of said projecting ends being adapted for coupling to a source of supply, and the other of said projecting ends extending laterally to provide a discharge end for the coil.

In testimony whereof I affix my signature.

JOSEPH NEWMIER.